Nov. 11, 1952 R. L. HOHL 2,617,919
LATERALLY EXPANSIBLE LIGHTING FIXTURE AND PART THEREFOR
Filed Sept. 17, 1947 10 Sheets-Sheet 4
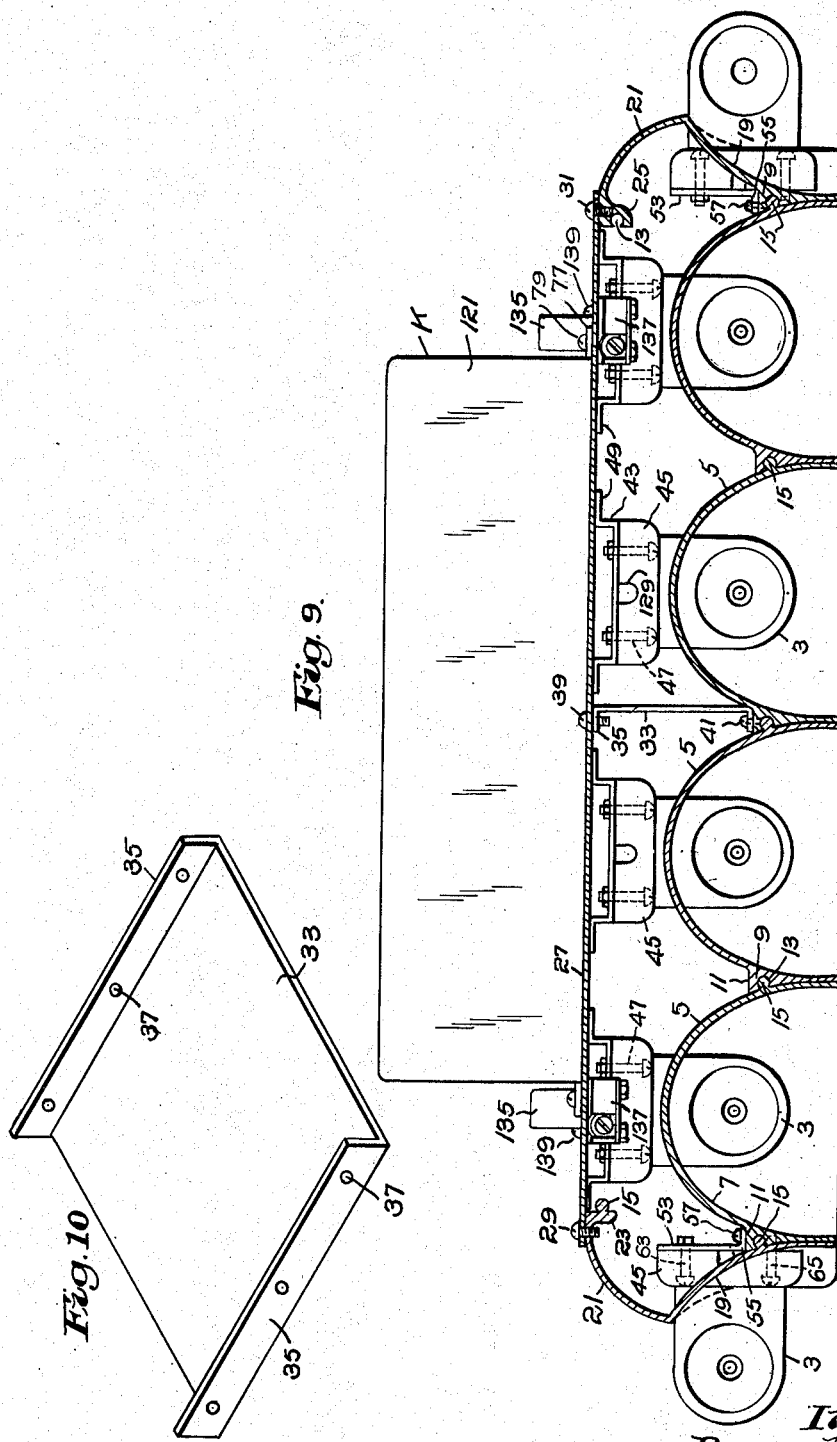
Inventor:
Russell L. Hohl.
By Emery, Booth, Townsend, Miller & Wardner
Attys

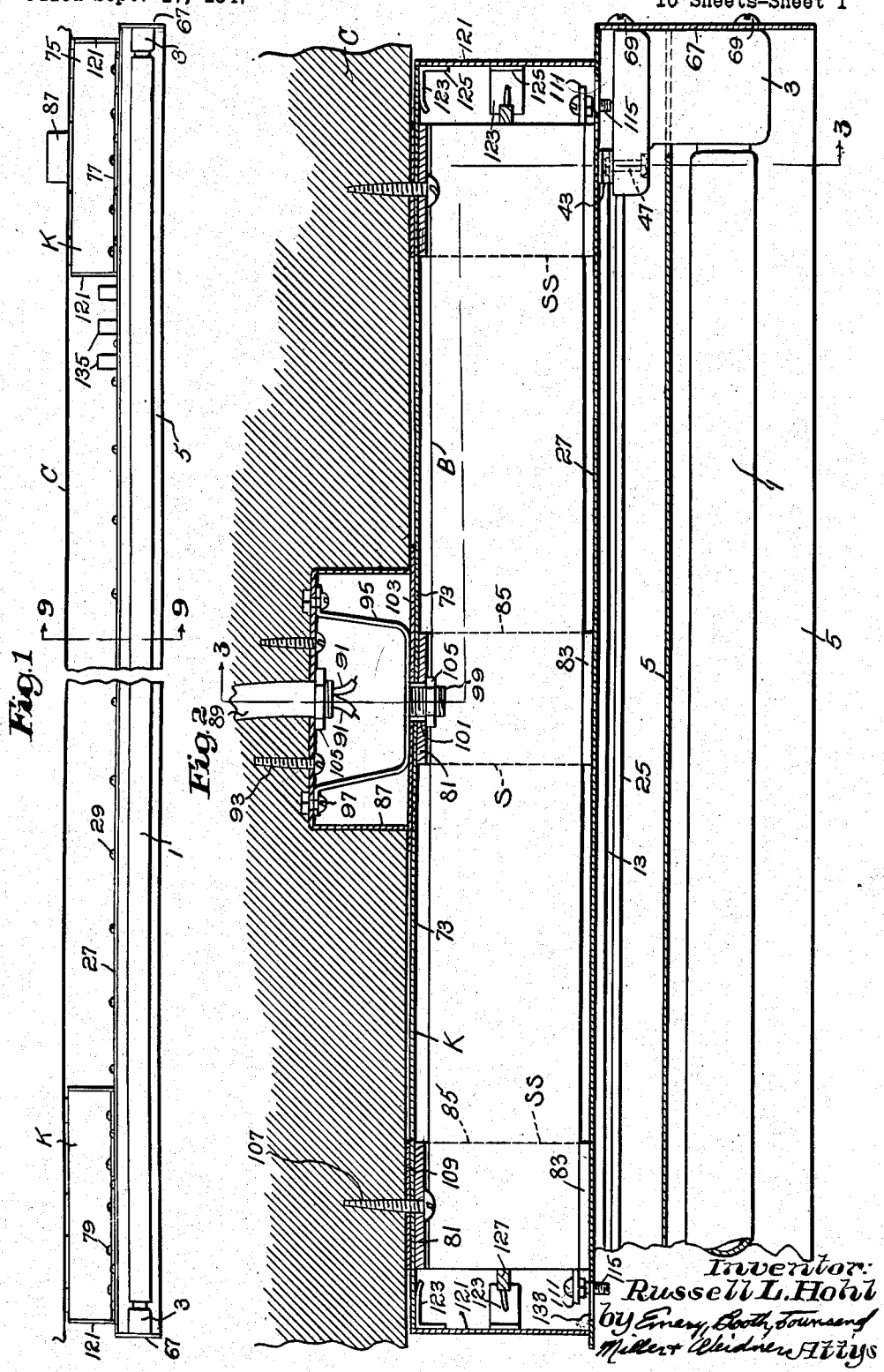

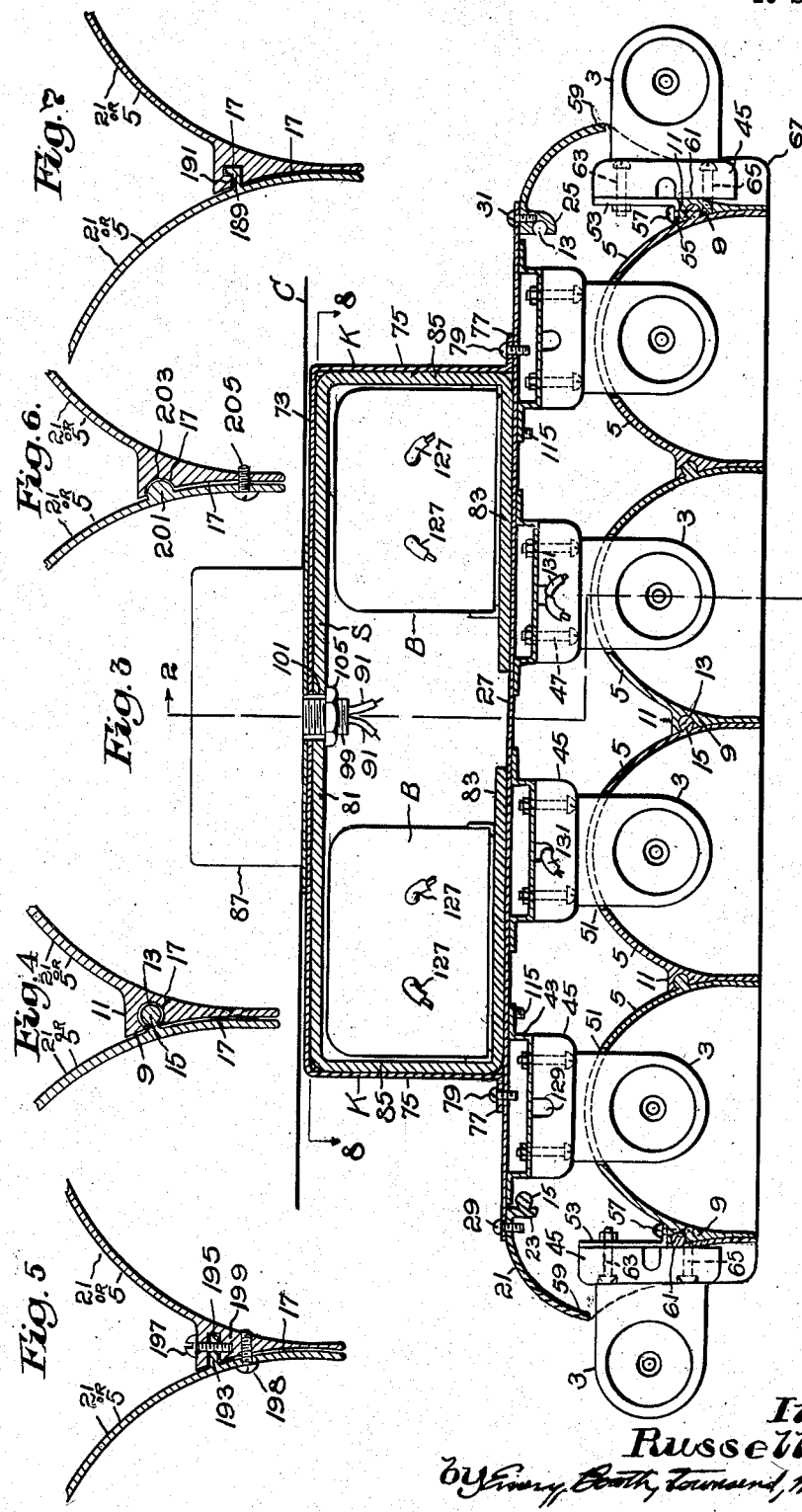

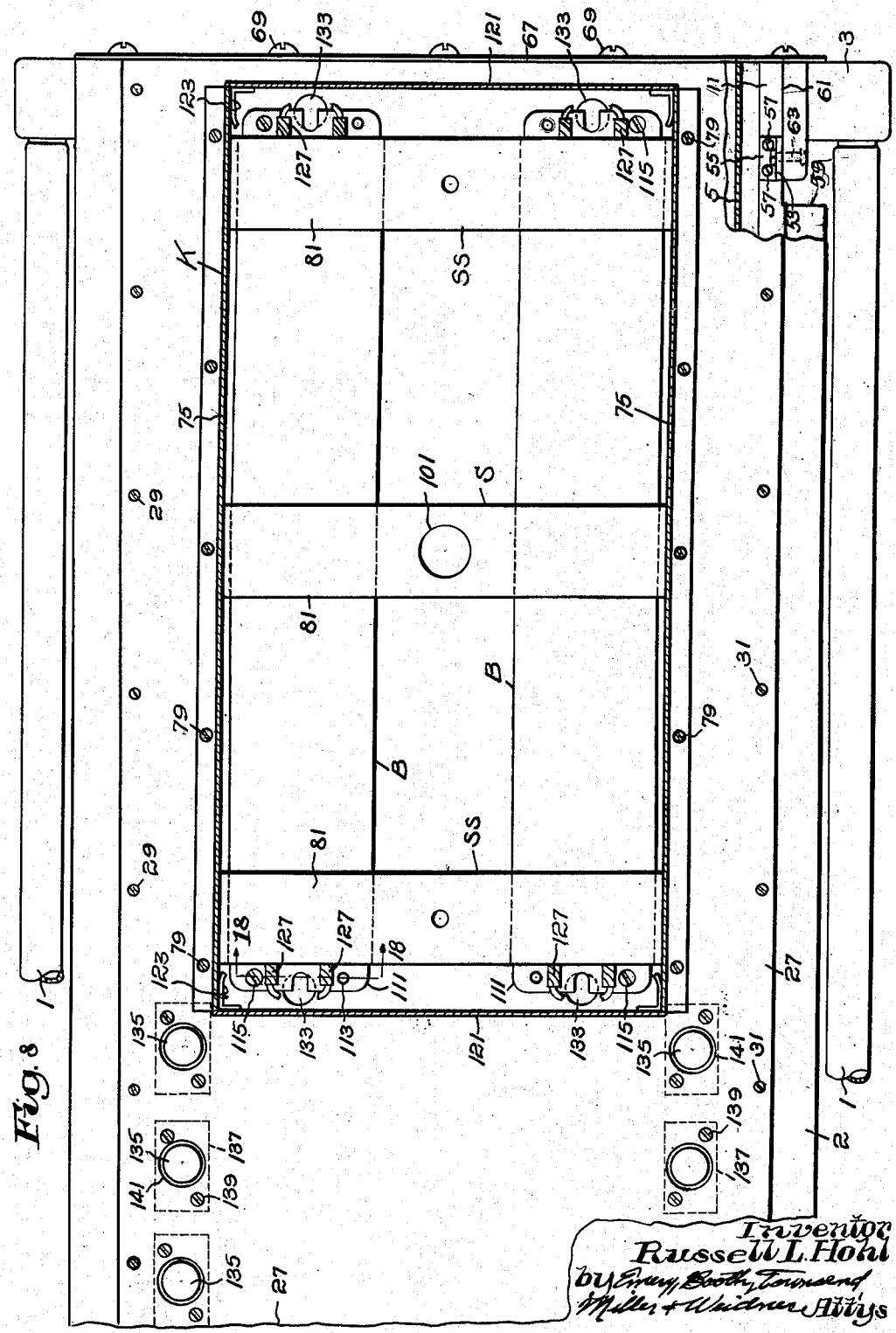

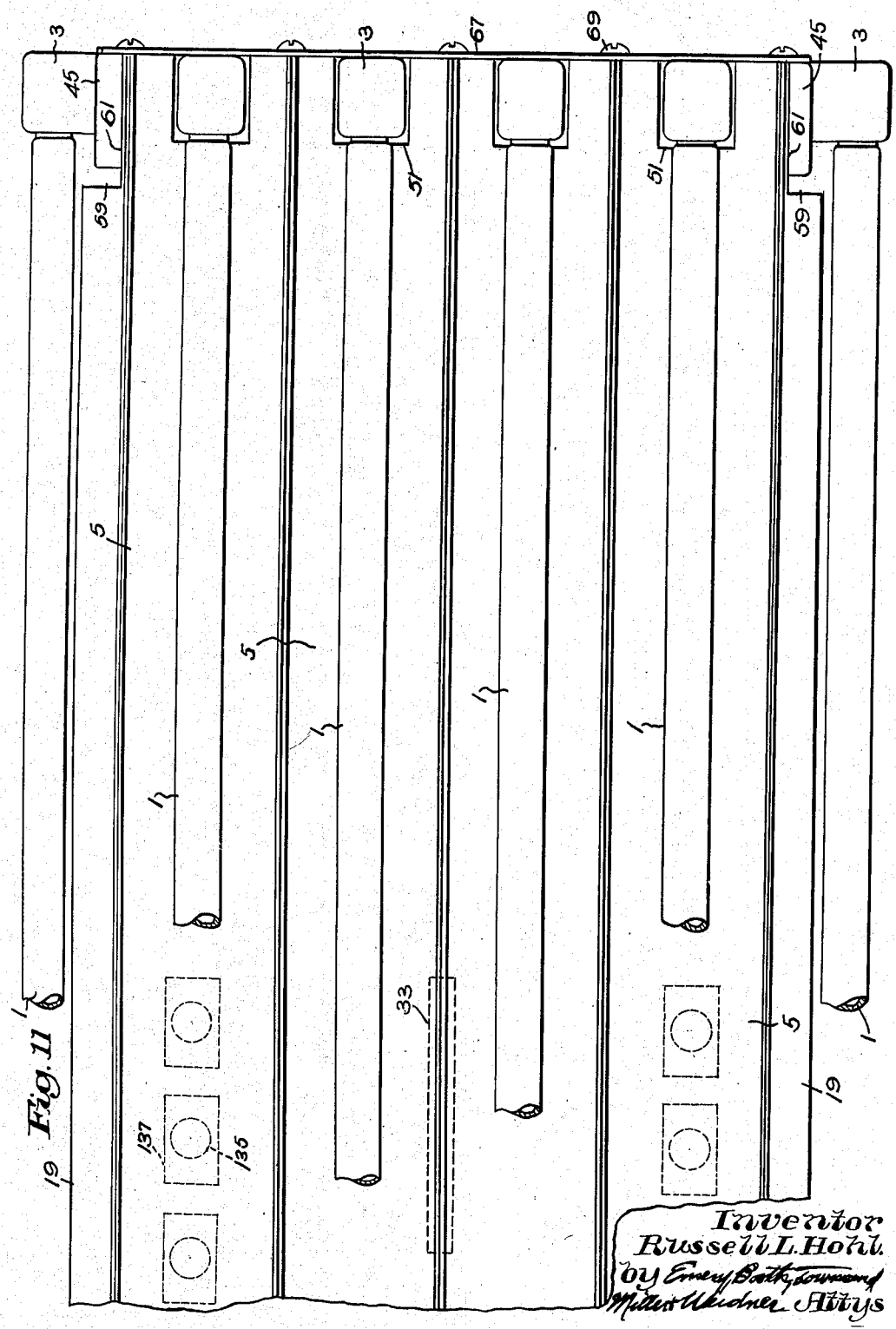

Nov. 11, 1952 R. L. HOHL 2,617,919
LATERALLY EXPANSIBLE LIGHTING FIXTURE AND PART THEREFOR
Filed Sept. 17, 1947 10 Sheets-Sheet 6
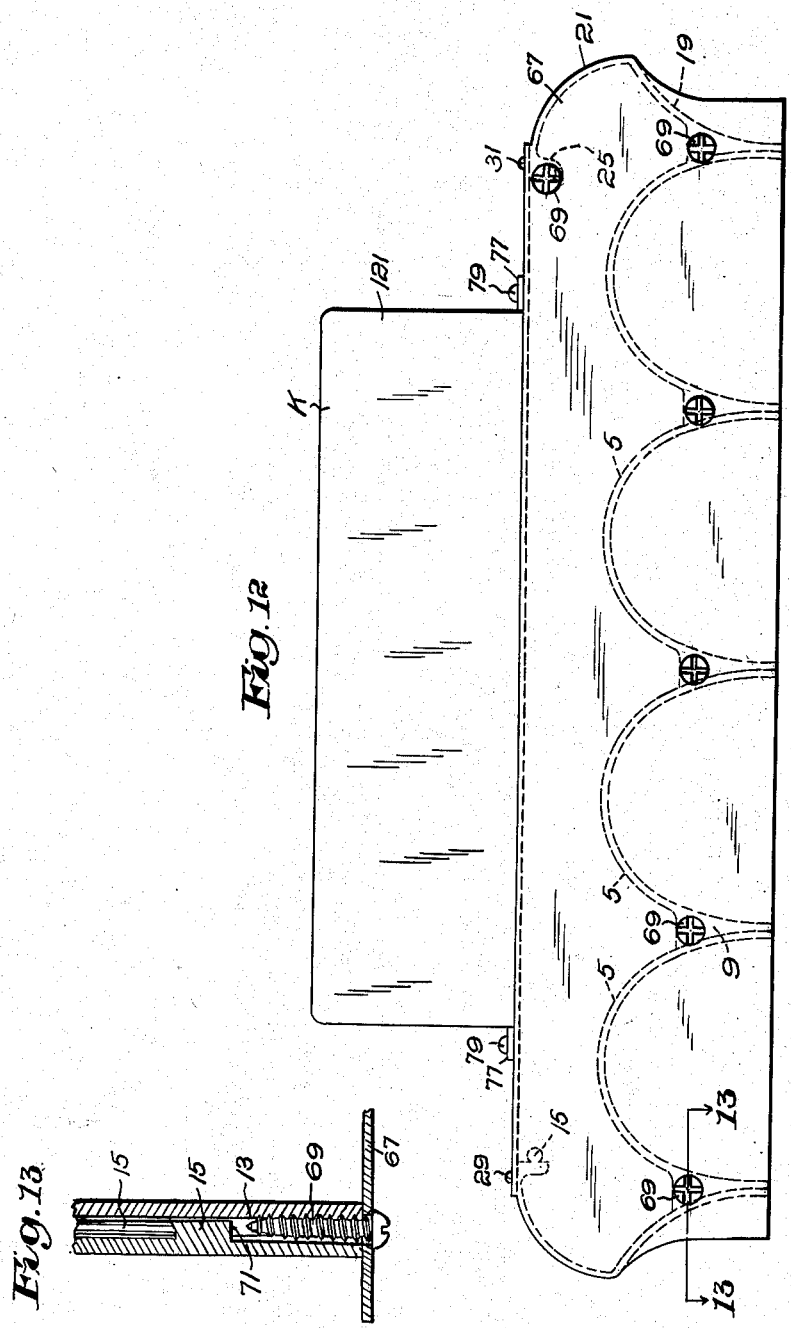
Inventor:
Russell L. Hohl.

Nov. 11, 1952 R. L. HOHL 2,617,919
LATERALLY EXPANSIBLE LIGHTING FIXTURE AND PART THEREFOR
Filed Sept. 17, 1947 10 Sheets-Sheet 7
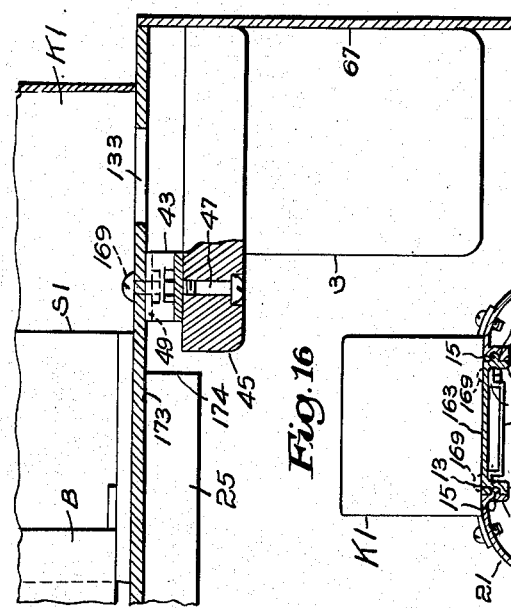
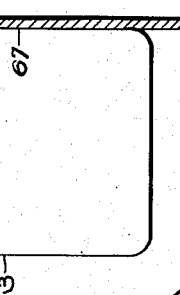
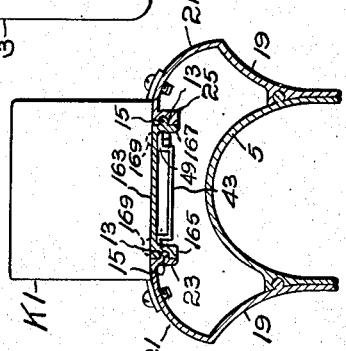
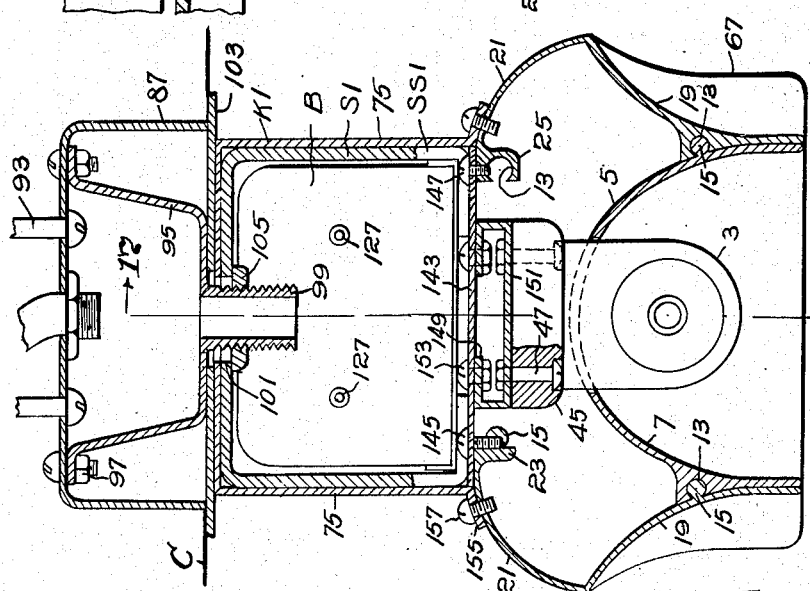
Inventor.
Russell L. Hohl,
by Emery, Booth, Townsend, Miller & Widner
Attys

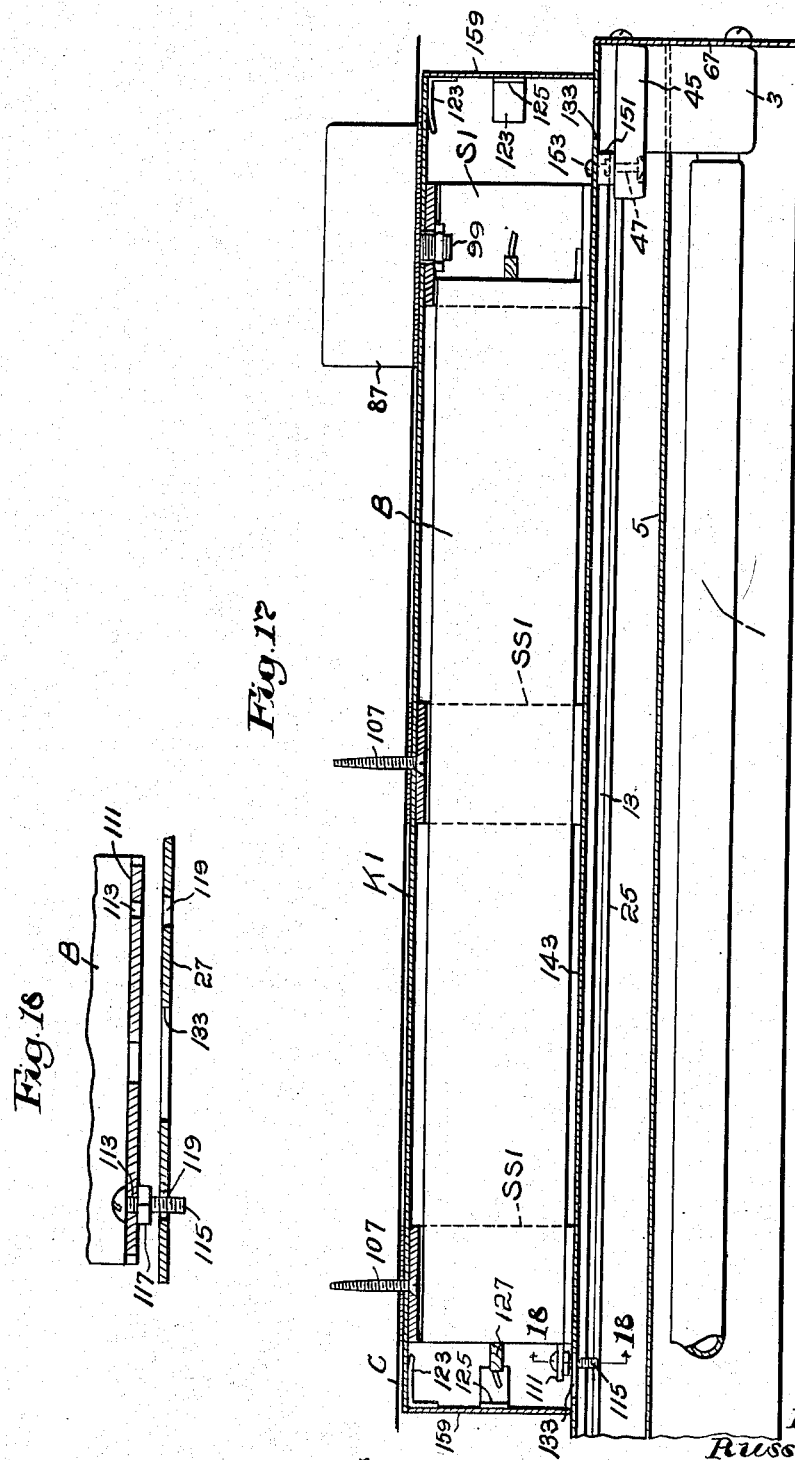

Nov. 11, 1952   R. L. HOHL   2,617,919
LATERALLY EXPANSIBLE LIGHTING FIXTURE AND PART THEREFOR
Filed Sept. 17, 1947   10 Sheets-Sheet 9
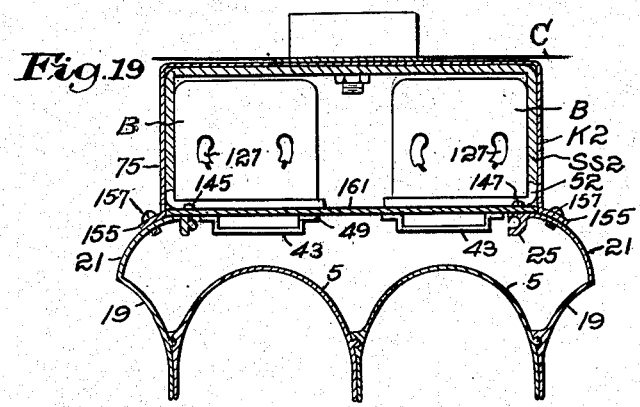
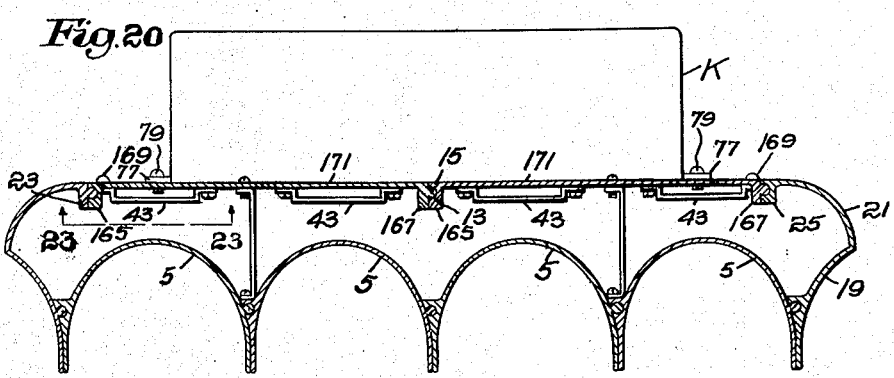
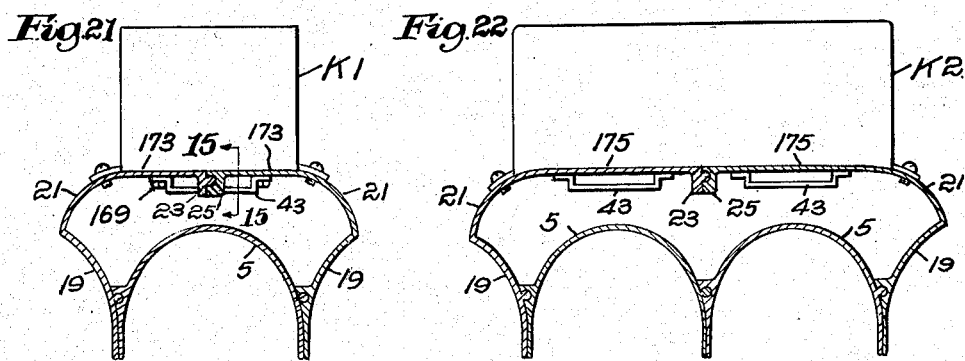
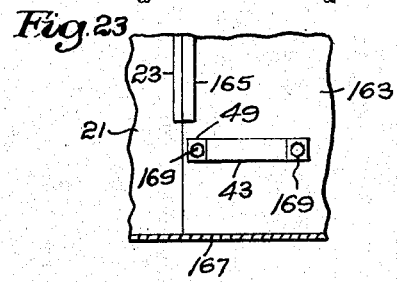
Inventor.
Russell L. Hohl
by Emery, Booth, Townsend, Miller & Weidner
Attys Nov. 11, 1952   R. L. HOHL   2,617,919
LATERALLY EXPANSIBLE LIGHTING FIXTURE AND PART THEREFOR
Filed Sept. 17, 1947   10 Sheets-Sheet 10

Inventor:
Russell L. Hohl,
by Emery, Booth, Townsend, Miller & Weidner
Attys

Patented Nov. 11, 1952

2,617,919

UNITED STATES PATENT OFFICE 2,617,919

LATERALLY EXPANSIBLE LIGHTING FIXTURE AND PART THEREFOR

Russell L. Hohl, Rome, N. Y., assignor to Revere Copper and Brass Incorporated, Rome, N. Y., a corporation of Maryland Application September 17, 1947, Serial No. 774,538

3 Claims. (Cl. 240—51.11)

My invention relates to lighting fixtures, particularly but not exclusively to those for elongated tubular fluorescent lamps, and to parts for use in such fixtures.

The invention has among its objects the provision of readily assembled and disassembled elongated elements adapted when assembled to form reflectors for one or more elongated tubular lamps carried by a lighting fixture comprising such elements. This and other objects of the invention will be best understood from the following description when read in the light of the accompanying drawings of several embodiments of the invention, while the scope of the invention will be more particularly pointed out in the appended claims.

In the drawings:

Fig. 1 is a side elevation of a lighting fixture, according to the invention, suspended from a ceiling;

Fig. 2 is a longitudinal section of the right hand end portion of the fixture according to Fig. 1, on an enlarged scale, corresponding to a section on the line 2—2 of Fig. 3;

Fig. 3 is a section on the line 3—3 of Fig. 2, with the lamps omitted;

Fig. 4 is a detail, on an enlarged scale, of a joint according to Fig. 3;

Figs. 5, 6 and 7 are, respectively, different modifications of the joint shown by Fig. 4;

Fig. 8 is a section on the line 8—8 of Fig. 3, with parts broken away;

Fig. 9 is a section on the line 9—9 of Fig. 1, with the lamps omitted;

Fig. 10 is an isometric view of a reinforcing member or strut employed in the fixture according to the invention;

Fig. 11 is a bottom view of a fragment of the fixture according to Figs. 1 to 4, 8, 9 and 10;

Fig. 12 is an end view of the fixture according to Figs. 1 to 4 and 8 to 11;

Fig. 13 is a section on the line 13—13 of Fig. 12, on an enlarged scale;

Fig. 14 is a section, corresponding to Fig. 3, showing a modified form of fixture according to the invention;

Fig. 15 is a section on the line 15—15 of Fig. 21, on an enlarged scale;

Fig. 16 is a section, corresponding to Fig. 9, showing a further modified form of fixture according to the invention;

Fig. 17 is a section on the line 17—17 of Fig. 14, with parts in elevation;

Fig. 18 is a section on the line 18—18 of Fig. 17, this section line being also applied to Fig. 8 for convenience in following the drawings;

Fig. 19 is a section, corresponding to Fig. 3, showing another modified form of fixture according to the invention;

Figs. 20 to 22 are, respectively, sections corresponding to Fig. 9 showing other different modified forms of fixtures according to the invention;

Fig. 23 is a section on the line 23—23 of Fig. 20; and

Figure 24:
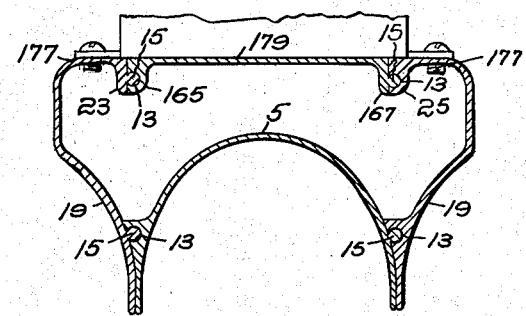
Figs. 24, 25 and 26 are, respectively, sections corresponding to Fig. 9, with parts omitted, showing still further different modified forms of fixtures according to the invention.

The fixture shown by Figs. 1 to 4 and 8 to 13 of the drawings carries the six elongated fluorescent lamps 1 (Figs. 1, 2, 8 and 11). These lamps, which at present are available in lengths up to eight feet, at opposite ends are removably carried by the lamp sockets 3 supported by the fixture.

As shown, each of the four intermediate lamps is associated with an elongated downwardly-opening trough-shaped member 5 extending substantially the length of the fixture, the concave side 7 of which member forms a reflector for the lamp. As shown, each of these members is formed adjacent the lower portion of its left hand side, as viewed in Figs. 3, 4 and 9, with a thickened portion 9 the upper surface of which presents a longitudinally extending ledge 11. Below this ledge this thickened portion is formed with an elongated recess or groove 13 opening on the outer side of the member. At its right hand side, as viewed in these figures, each member is formed with a longitudinally extending bead 15. As shown, the interior surface of the recess 13 and exterior surface of the bead 15 in transverse cross-section present complementary arcs greater than 180° of circles, so that when the bead is entered into the recess a joint is formed between adjacent members 5 locking them together against separation except longitudinally of the members. To make the joint, the bead of one member is presented to the end of the recess of the adjacent member, and the two are then moved longitudinally relative to each other to make the joint.

The trough-shaped members 5 are preferably made by extruding metal through a die having an opening the shape of the member, this metal preferably being aluminum or an aluminum base alloy. In this way the member is of the same transverse cross-section throughout its length, so that the recesses 13, beads 15 and thickened portion 9 of the member extend continuously for its full length. The parts are so dimensioned as to present between them the clearance 17 shown in Fig. 4, this clearance amounting to one or two hundredths of an inch. This readily permits adjacent members to be slid relatively longitudinally with a minimum of friction when assembling or disassembling the joint. The slight out of straightness inherent to an extruded shape causes the parts at rather widely spaced points throughout their lengths to take up the clearance and contact each other so that in effect a rigid joint is produced.

The part comprising the trough-like members 5 of the fixture according to Figs. 1 to 4 and 8 to 13 is shown as provided with side members, the lower portions 19 of which are curved identically with the corresponding portions of the members 5 to present reflectors for the lamps at the extreme lateral sides of the fixture. These side members also are formed as extruded shapes, preferably of the same metal as the members 5, so that they are continuously of the same transverse cross-section throughout their lengths. As shown, each side member has a portion 21 extending to above the plane of the tops of the members 5 so as to form therewith a channel-shaped structure which, among other things, adds rigidity to the assembly. As illustrated, the portion 9 of the side member at the left hand side of the fixture, as viewed in Figs. 3 and 9, is also formed continuously throughout its length with a longitudinally extending continuous bead 15 identical with that presented by the member 5. The portion 19 of the side member at the right hand side of the fixture, as viewed in Fig. 9, is also formed continuously throughout its length with a thickened portion 9 having a longitudinally extending continuous recess 13 identical with the thickened portion and recess of the member 5. In this way the side members may be joined to the adjacent sides of the adjacent trough-shaped members 5 by longitudinal sliding of the parts in the same way that those trough-shaped members are joined to each other.

The upper portion 21 of each side member is shown as bent inwardly toward the vertical medial plane of the fixture, adding stiffness to the side members and hence to the assembly. For a purpose hereinafter described, the left hand side member, as viewed in Fig. 9, is provided with a downturned flange 23 extending throughout its length, which flange intermediate its height is integrally formed with a further longitudinally extending bead 15 identical with the bead 15 on the lower portion 19 of the side member. The opposite side member is constructed similarly to that just described, except that the downturned flange 25 thereof is provided on its outer side intermediate its height with a longitudinally extending recess 13 identical with that formed on the lower portion 19 of this side member.

The inturned portions of the two side members of the fixture according to Figs. 1 to 4 and 8 to 13 carry a closure in the form of a plate 27 which extends substantially the length of the fixture and, in conjunction with the trough-shaped parts 5 and side members, forms a wiring conduit for the leads extending to the lamp sockets at the opposite ends of the fixture, this closure further acting to augment the rigidity of the assembly. At its edge adjacent the side member having the bead 15 the plate 27 is shown as secured to that side member by screws 29 (Figs. 1, 3 and 9) tapped into the portion 21 thereof and distributed throughout the length of the fixture, while at its edge adjacent the side member having the recess 13 the plate is shown as secured to that side member by screws 31 tapped into the flange 25 and distributed throughout the length of the fixture.

For giving further rigidity to the assembly one or more struts 33 (Figs. 9, 10 and 11) may be employed. As shown, these struts are provided with opposite flanges 35 provided with perforations 37. The upper flange 35, as viewed in Fig. 9, is shown as secured to the plate 27 by screws 39 tapped into the latter, while the lower flange rests upon the ledge 11 presented by the thickened portion 9 of the adjacent trough-shaped member 5, being secured to such thickened portion by screws 41 (Fig. 9) tapped into it.

The lamp sockets 3 for the four intermediate lamps of the fixture according to Figs. 1 to 4 and 8 to 13 are shown as carried by the U-shaped clips 43 (Fig. 9), the bases 45 of the lamp sockets resting against these clips and being secured thereto by bolts 47. The clips are shown as provided at opposite sides thereof with feet 49 resting against the under side of the plate 27. In this modification these feet are preferably secured to the plate by spot welding them to it.

As best illustrated in Figs. 3 and 11, the trough-shaped members 5 for the four intermediate lamps of the fixture according to Figs. 1 to 4 and 8 to 13 are notched at their ends, as indicated at 51, to permit the lamp sockets to project from the upper to the lower sides of said members.

The lamp sockets 3 for the two lamps at the extreme opposite sides of the fixture, as shown, are supported by clips 53 having bases 55 (Figs. 3, 8 and 9), the latter resting upon the ledges 11 presented by the adjacent thickened portions 9 of the adjacent trough-shaped members 5 and being secured to those thickened portions by screws 57 tapped into them. The end portions of the side members are notched at 59, which notches provide surfaces 61 on the side members aligned with the outer surfaces of the vertical upstanding portions of the clips 53 as will be clear from Fig. 3. The bases 45 of the lamp sockets rest against these aligned surfaces, being secured to the clips by bolts 63, and being secured to the side members by screws 65 tapped into the adjacent thickened portions 9 below the ledges 11.

As best illustrated in Figs. 1, 11 and 12, the part of the lighting fixture formed by the trough-shaped members 5, side members, and closure plate 27 is provided at each of opposite ends with a cover or end plate 67. This cover plate conveniently is held in position by screws 69 (Figs. 12 and 13) tapped into the ends of the longitudinally extending recesses 13 of the thickened portions 9 of the trough-shaped members 5, and into the like recess 13 of the flange 25 of the right hand side member as viewed in Figs. 9 and 12, the beads 15 being cut away, as indicated at 71 (Fig. 13), adjacent the cover plate to permit entrance of the screws into the recesses.

Referring particularly to Figs. 1, 2, 3 and 8, at each end of the fixture is a casing K having a top wall 73 and opposite vertical side walls 75. At the lower edge of each of the side walls is formed a flange 77, and against the under sides of these flanges rests the closure plate 27, the latter being secured to the flanges by rows of screws 79.

Interiorly of the casing K are shown transversely arranged spaced supports S and SS. Each of these supports, which conveniently is formed of a bar bent to the desired shape, has an upper transverse portion 81 and spaced lower transverse portions 83, the outermost ends of which latter are connected to the outer ends of the former by vertical portions 85.

In the ceiling C above one of the casings K is shown an outlet box 87 for the conduit 89 (Fig. 2) through which extend the leads 91 constituting the line for energizing the lamps, this box being secured to the ceiling in any suitable manner as, for example, by screws 93. The box is shown as interiorly carrying a U-shaped bracket 95 secured to the box top by bolts 97. Integral with the bracket is a vertically positioned tubular nipple 99 through which the leads 91 may extend into the interior of the casing K. This nipple extends downwardly into the casing through aligned openings 101 formed in the top portion 81 of the support S, top wall 73 of the casing, and ceiling plate or outlet box cover 103, against the under side of which latter the top wall of the casing rests. A nut 105 screw-threaded on the nipple below the top portion 81 of the support S serves to hold the lighting fixture to the ceiling. Additional securing means is provided by the screws 107 extending into the ceiling through aligned openings in the top portions 81 of the supports SS, top wall 73 of the casing, and spacer plates 109 interposed between the casing and the ceiling. The other casing K, adjacent which there is no ceiling outlet box, may be secured to the ceiling wholly by use of the supports SS and screws 107, the support S in such case being substituted by an additional support SS.

A pair of elongated ballasts B are shown as resting upon the lower portions 83 of the supports S and SS. As shown, each ballast at each end at its lower portion has a projecting end flange 111 (Figs. 2 and 8) provided with a pair of perforations 113. Each ballast conveniently may be secured against movement relative to the supports S and SS by use of screws 115 (see also Fig. 18) extending through perforations 113 at opposite ends of the ballast and secured to the flanges 111 by nuts 117, the lower ends of the screws loosely extending through perforations 119 in the cover plate 27. In this way the weight of the parts of the lighting fixture below the ballast is not transmitted to the ballast, those parts being supported solely by the casing K which in turn is supported by the supports S and SS.

The casing K is shown as provided with removable end plates 121. Carried by each end plate adjacent its edges are spring prongs or clips 123 (Figs. 2 and 8) having bases 125 secured to the end plate in any convenient way, as by spot welding. The clips are entered into the casing to bear against its interior walls so as to frictionally hold the end plate removably in place.

The ballast B as commonly constructed has a pair of leads 127 (Figs. 3 and 8) projecting from each of its opposite ends. The base portions 45 of the lamp sockets 3, as shown, are formed with notches 129 (Fig. 3) providing openings for the lamp energizing leads 131 connected to the lamp terminals (not shown) housed by said base portions. With some circuits the lamp socket for each end of the lamp has two terminals, while with other circuits the lamp socket for one end of the lamp has but one terminal while that for the other end of the lamp has two terminals. The ballast commonly can take care of no more than two lamps, making it necessary under these circumstances to employ in the six-lamp fixture according to Figs. 1 to 4 and 8 to 13 two ballasts in one casing K and at least one ballast in the other casing K. Commonly the circuit is such, when the ballast takes care of two lamps, that one of the pair of leads 127 at one end of the ballast is connected to one of the leads 91 constituting one side of the line, while the other lead 127 of that pair is connected to a terminal of a lamp socket having two terminals, the other lead 91 constituting the other side of the line being connected to a terminal of another lamp socket having two terminals, while the two leads 127 at the opposite end of the ballast are connected to separate lamp sockets each having one terminal. This is mentioned to indicate that the wiring carried by the lighting fixture is commonly fairly complex, necessitating running leads from one end of the fixture to the other through the wiring conduit constituted by the parts below the casing K. The space between the two ballasts, as shown in Fig. 3, provides room for splicing various leads necessary to complete the circuits. Further, the plate 27 adjacent each end of each ballast is shown as provided with an opening 133 (Figs. 2, 8 and 18) providing for passage of leads from the casing to this wiring conduit.

When the circuit and lamps are such that so-called "starters" for the lamps are necessary the same conveniently may be located as indicated at 135 (Figs. 1, 8 and 9). The sockets 137 for the starters may be mounted beneath the plate 27 and secured thereto by bolts 139. In the plate may be provided openings 141 through which the starters may be inserted from the upper side of the plate into these sockets.

It will be understood that the trough-shaped members 5 and side members 19, 21, identical with those heretofore described, may be assembled to form fixtures of different widths to accommodate different numbers of lamps. For example, as shown in Fig. 14, but one trough-shaped member is employed, and, as shown in Fig. 19, two trough-shaped members. This enables the trough-shaped members and side members to be readily assembled to form fixtures of varying widths, or a fixture of given width to be expanded or contracted to take care of a greater or lesser number of lamps respectively.

The fixture shown by Figs. 14 and 17 is substantially identical in construction with that heretofore described, except that it employs but one trough-shaped member 5. In place of the closure plate 27, Fig. 14 shows a narrower plate 143 secured to the side members by rows of screws 145 and 147 tapped into the adjacent bead 15 and flange 25, respectively, of the two side members. The feet 149 of the lamp socket supporting clip 151 are shown in Fig. 14 as bent inwardly instead of outwardly as heretofore, and are secured to the plate 143 by bolts 153. Similarly the supports S1 and SS1 in the casings K1 are transversely narrower than the supports S, SS and K, heretofore described, so as to accommodate but one ballast. Similarly to the construction heretofore described, the side walls 75 of the casing K1 are provided at their lower edges with outturned flanges 155 conforming to the adjacent surfaces of the side members, which flanges are secured to the side members by rows of screws 157.

In the modification according to Figs. 14 and 17 the ceiling outlet box 87 is positioned adjacent the right hand end of the ballast casing K1, as viewed in Fig. 17, so as to provide a space for the wiring and splices between the end of the ballast and adjacent ballast casing end plate 159, while the supports SS1 are positioned in spaced relation at one side of the support S1 connected to the outlet box. It will be noted that the construction shown by Fig. 17 permits the lamp socket supporting clip to be bolted or, if desired, riveted to the top closure plate carried by the side members, instead of being welded thereto as heretofore described in connection with the arrangement of parts shown by Fig. 2. If desired, however, the construction shown by Fig. 2 may be modified to embody that shown by Fig. 17 in so far as necessary to permit the lamp socket supporting clips to be secured to the cover plate in the way shown by Fig. 17.

The fixture shown by Fig. 19, in which but two of the trough-shaped members 5 are employed for accommodating two intermediate lamps and, if desired, also two side lamps, is substantially identical with the fixture shown by Figs. 1 to 4 and 8 to 13 heretofore described, except that the ballast casing K2 and ballast supports S2 and SS2 are transversely narrower than the corresponding casing K and supports S and SS of the last mentioned fixture. Further, to provide the maximum possible space between the ballasts, the side walls 75 of the ballast casing, like the side walls of the ballast casing shown in Fig. 14, have flanges 155 conforming to the curved outer surfaces of the portions 21 of the side members, the closure plate 161 of Fig. 19 being secured to these portions 21 by the screws 145 and 147, also as in Fig. 14.

Instead of having the closures for the wiring conduits presented by the trough-shaped parts 5 and the side members 19, 21 in the form of the plates employed in the preceding modifications, the same may be formed of extruded shapes as, for example, the shape 163 shown in Fig. 16 illustrating a fixture otherwise generally identical with that illustrated by Fig. 14. This shape 163, which extends continuously for substantially the length of the fixture, at one edge is formed with a downwardly projecting longitudinally extending flange 165 identical with the flange 25 of one of the side members, and at its opposite edge with a downwardly projecting longitudinally extending flange 167 identical with the flange 23 of the other side member, so as to present a bead 15 on the flange 167 complementary to the recess 13 in the flange 25 and a recess 13 in the flange 165 complementary to the bead 15 on the flange 23. This enables the closure 163 to be joined to the side members by sliding of the closure longitudinally relative to the side members. In this modification (Fig. 16) the feet 49 of the lamp socket supporting clips are shown as secured to the closure 163 by bolts 169. For preventing interference of the flanges 165 and 167 with the positioning of these feet said flanges at their ends adjacent the clips are cut away, as hereinafter described in connection with Figs. 20 and 23. Otherwise the flanges 165 and 167 extend continuously for the full length of the closure.

The modification shown by Figs. 20 and 23 is like that shown by Figs. 1 to 4 and 8 to 13, except that for the closure plate 27 of the latter are substituted the two identical elongated extruded plate-like closure shapes 171 extending for substantially the length of the fixture. These closure shapes are each identical with that described in connection with Fig. 16, except that they are wider, the bead 15 on the flange 167 adjacent the vertical medial plane of the fixture cooperating with the recess 13 in the adjacent flange 165 to secure the two closure shapes together, while at opposite sides of the fixture the flanges 165 and 167 are secured to the flanges 23 and 25 of the two side members as described in connection with Fig. 16. To prevent interference of the joined flanges 23 and 165 and joined flanges 25 and 167 with the adjacent feet 49 of the lamp supporting socket clips 43 said flanges at their ends adjacent the clips are cut away, as indicated in Fig. 23 in connection with the flanges 23 and 165. Otherwise these flanges are of the same lengths as the closure shapes. As described in connection with Fig. 16, these clips are secured to the shapes 171 by bolts 169.

With fixtures of narrow width, such as shown by Figs. 21 and 22, the closure plate may be formed as integral parts of the extruded side members. As shown by Fig. 21, the portions 21 of the side members are transversely extended, as indicated at 173, to the vertical medial plane of the fixture. The edges of the side members at this medial plane are formed one with the downwardly projecting longitudinally extending beaded flange 23 and the other with the downwardly projecting longitudinally extending recessed flange 25, so that the two side members may be joined at these edges by longitudinal sliding of one relative to the other. For preventing interference of the flanges 23 and 25 with the clips 43, in the modification shown by Fig. 21 said flanges adjacent their ends are cut away, as indicated at 174 in Fig. 15. Otherwise these flanges extend continuously for the full lengths of the side members.

The modification shown by Fig. 22 is similar to that shown by Fig. 21, the portions 21 of the extruded side members being extended transversely, as indicated at 175, to the vertical medial plane of the fixture where their adjacent edges are provided with the beaded flange 23 and recessed flange 25, respectively, enabling the two side members to be joined by longitudinal sliding of one relative to the other.

Figure 26:
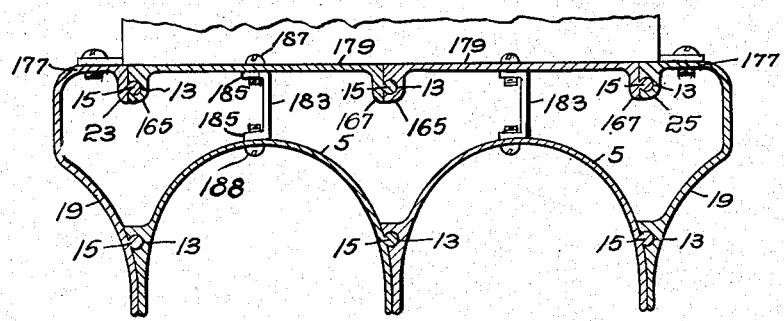

In the modification shown by Fig. 24 each extruded side member is integrally provided with an upper portion 177 extending toward the medial plane of the fixture, the edge of one of these side members being provided with a downwardly projecting longitudinally extending beaded flange 23 and the edge of the other with a downwardly projecting longitudinally extending recessed flange 25. These flanges, which extend continuously for the full lengths of the side members, are shown as connected to each other by an elongated extruded plate-like closure shape 179 also extending for the full lengths of the side members, the closure shape having at one edge a flange 165 and at its opposite edge a flange 167 respectively formed with a recess 13 complementary to the bead 15 of the flange 23 and with a bead 15 complementary to the recess 13 of the flange 25, so that the shape 179 may be joined to the two side members by sliding it longitudinally relative to said side members. In this modification the distance between the recess 13 in the flange 165 and the bead 15 on the flange 167 is the same as between the recess 13 and bead 15 of the trough-shaped member 5. This enables a fixture to be formed of any number of joined members 5 by employing an equal number of the members 179 joined together as indicated in Fig. 26, and enables a fixture having a given number of members 5 to be readily expanded transversely by the insertion of additional members 5 and additional members 179.

Figure 25:
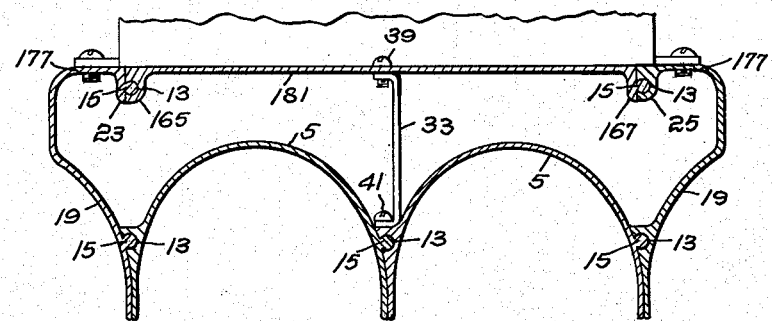

If desired, when the fixture has but two trough-shaped members 5, the flanges 23 and 25 of the side members according to Fig. 24 may be joined by a single elongated plate-like extruded shape 181 as shown by Fig. 25, the distance between the recess 13 in the flange 165 and the bead 15 on the flange 167 of this shape 181 being equal to twice the distance between the recess 13 and the bead 15 of a trough-shaped member 5. It will be further understood that by use of the shapes 179 and 181 the fixtures shown by Figs. 24 to 26 may be readily expanded to include any number of trough-shaped members. For example, if three trough-shaped members were employed, three shapes 179 could be employed, or one shape 179 with a shape 181. Similarly, it will be understood that the shapes 179 and 181 may be employed for expanding the fixtures shown by Figs. 21 and 22 to include any number of trough-shaped members. In the sense that the distance D between the bead and recess on the shape 179 is equal to the distance $d$ between the bead and recess on the member 5, and the distance D' between the bead and recess on the shape 181 is twice this distance $d$, the distances D and D' may each be said to be an integer multiple of the distance $d$.

The fixture shown by Fig. 25 may be reinforced by one or more of the struts 33 heretofore described. In the fixture according to Fig. 26, where said struts cannot be conveniently employed, struts 183 of similar construction may be employed, the struts 183 at opposite ends having feet or flanges 185 resting against the shape 179 and trough-shaped member 5, respectively, and being secured thereto by screws 187 and 188.

In place of the slip joints having the beads 15 and recesses 13, other forms of interlocking joints may be employed. For example, as shown by Fig. 7, the bead may be L-shaped in cross-section as indicated at 189, and the recess 191 of complementary cross-section. As shown in Fig. 5, the bead takes the form of a flat-sided flange 193 extending into a complementary recess 195, which construction will interlock the parts against relative movement in a vertical direction, lateral withdrawal of the flange from the recess being resisted preferably by screws 197 extending through the flange and tapped into the thickened portion 199 of the trough-shaped member 5, or by screws 198 if the construction does not readily permit the use of the screws 197 as in that shown by Figs. 21 and 22. In the modification shown by Fig. 6 the trough-shaped member at one side is formed with a bead 201 received in a complementary recess 203, each of such shape that the parts are interlocked against only relative vertical movement, as in the modification shown by Fig. 5, relative lateral movement being resisted by screws 205 extending through the side of the trough-shaped member having the bead and tapped into the adjacent side of the adjacent trough-shaped member having the recess.

It will be understood that within the scope of the appended claims wide deviations may be made from the forms of the invention described without departing from the spirit of the invention.

I claim:

1. A laterally expansible sectional lighting fixture part comprising a plurality of identical elongated trough-like members arranged in side by side laterally abutting relation, the concave inner sides of which members are light reflecting for adapting said members to serve as light reflectors for tubular lamps; each member at one of its outer sides adjacent its longitudinally extending terminal edge at that side being integrally formed lengthwise thereof with a rearwardly extending portion, which portion is of progressively greater thickness as it so extends and is formed with an outer surface that transversely of said portion is concave, the opposite outer side of said member adjacent its terminal edge at that side being complementarily convex with respect to said concave surface, such convex surface of one member being received by and fitting the concave surface of the adjacent member; that portion of each member which has said concave surface being formed with a longitudinally extending recess opening on said concave surface intermediate its width and presenting the female part of a separable interlocking slip joint, the opposite outer side of said member being formed intermediate the width of said convex surface with a longitudinally extending bead presenting the cooperating male part of such joint, the members being directly connected by said joints and whereby additional identical members may be joined to either or both sides of said sectional part.

2. A laterally expansible sectional lighting fixture part comprising elongated side members and at least one elongated trough-like member, the concave inner side of which latter is light reflecting for adapting said trough-like member to serve as a light reflector for an elongated tubular lamp; said trough-like member at one of its outer sides adjacent its longitudinally extending terminal edge at that side being integrally formed lengthwise thereof with a rearwardly extending portion, which portion is of progressively greater thickness as it so extends and is formed with an outer surface that transversely of said portion is concave, the opposite outer side of said troughlike member adjacent its terminal edge at that side being complementarily convex with respect to said concave surface, for adapting the convex or concave surface of an identical trough-like member to fit either said concave or convex surface, respectively; said portion having said concave outer surface being formed with a longitudinally extending recess opening on said concave surface intermediate its width and presenting the female part of a separable interlocking slip joint, the opposite outer side of said trough-like member being formed intermediate the width of said convex surface with a longitudinally extending bead presenting the cooperating male part of such joint, for adapting an identical trough-like member to be joined directly to either side of the first mentioned trough-like member in side to side relation thereto with the said convex outer surface of one fitted into the said concave outer surface of the other; the outer side of one of said side members being formed with a concave surface portion complementary to said convex outer surface of said trough-like member and with a longitudinally extending recess opening on said concave surface portion presenting the female part of an identical separable interlocking slip joint, and the outer side of the other side member being formed with a convex surface portion complementary to said concave outer surface of said trough-like member and with a longitudinally extending bead intermediate the width of said convex surface portion presenting the male part of such joint.

3. A member for forming a laterally expansible lighting fixture part, which member consists of an elongated extruded metal shape of trough-like cross-section the inner side of which is light reflecting for adapting said shape to serve as a light reflector for a tubular lamp, said shape at one of its outer sides adjacent its longitudinally extending terminal edge at that side being integrally formed lengthwise thereof with a rearwardly extending portion which is of progressively greater thickness as it so extends and is formed with an outer surface that transversely of said portion is concave, the opposite outer side of said shape adjacent its terminal edge at that side being formed with a surface that is complementarily convex with respect to said concave surface, said portion having said concave outer surface being formed with a longitudinally extending recess opening on said surface intermediate its width and presenting the female part of a separable interlocking slip joint, and the opposite outer side of said shape being formed intermediate the width of said convex surface with a longitudinally extending bead presenting the cooperating male part of such joint, whereby an identical shape may be directly connected to the first mentioned shape at either or both sides of the latter with said convex surface of one received in and fitting the concave outer surface of the other.

RUSSELL L. HOHL.

REFERENCES CITED

The following references are of record in the file of this patent:

UNITED STATES PATENTS

| Number | Name | Date |
|---|---|---|
| 964,058 | Sanford | July 12, 1910 |
| 1,784,171 | Bertling | Dec. 9, 1930 |
| 1,945,859 | Katz | Feb. 6, 1934 |
| 2,182,434 | Hohl | Dec. 5, 1939 |
| 2,196,214 | Kantack | Apr. 9, 1940 |
| 2,232,499 | Waterbury | Feb. 18, 1941 |
| 2,249,318 | Locke | July 15, 1941 |
| 2,265,021 | Beals | Dec. 2, 1941 |
| 2,306,597 | Darley | Dec. 29, 1942 |

FOREIGN PATENTS

| Number | Country | Date |
|---|---|---|
| 563,294 | England | Aug. 8, 1944 |